Jan. 5, 1932. M. JANKISZ 1,839,317
HAND TRUCK
Filed May 18, 1931

INVENTOR
Martin Jankisz
BY his ATTORNEYS

Patented Jan. 5, 1932

1,839,317

UNITED STATES PATENT OFFICE

MARTIN JANKISZ, OF BROOKLYN, NEW YORK

HAND TRUCK

Application filed May 18, 1931. Serial No. 538,181.

This invention relates to a hand truck which is essentially suitable for wheeling heavy ashcans up a flight of stairs.

The invention is designed to provide a frame for carrying the can with wheels for wheeling it along the ground and a lever for actuating a foot arm made to coact with the tread of the stairs to lift the truck, thereby raising it to the next step.

An object of the invention is to provide the lever with a spring or counter-weight which is held under tension or expansion and, by its compression, it will press the foot arm downwardly, thereby lifting the truck with its ashcan to the succeeding step of the stairway.

Another object of the invention is to provide a device operated by the compression of the spring for raising one end of the can to the frame of the truck and sliding it into a cradle to prevent it from shifting laterally.

The invention resides more particularly in the novel features hereinafter described and claimed, reference being made to the accompanying drawings in which:

Figure 1:
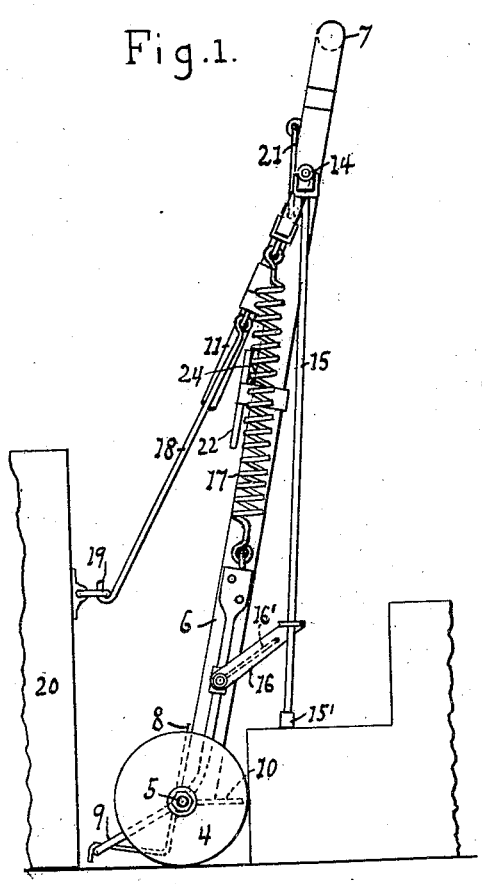
Fig. 1 represents a side elevation of a hand truck embodying this invention.
Figure 2:
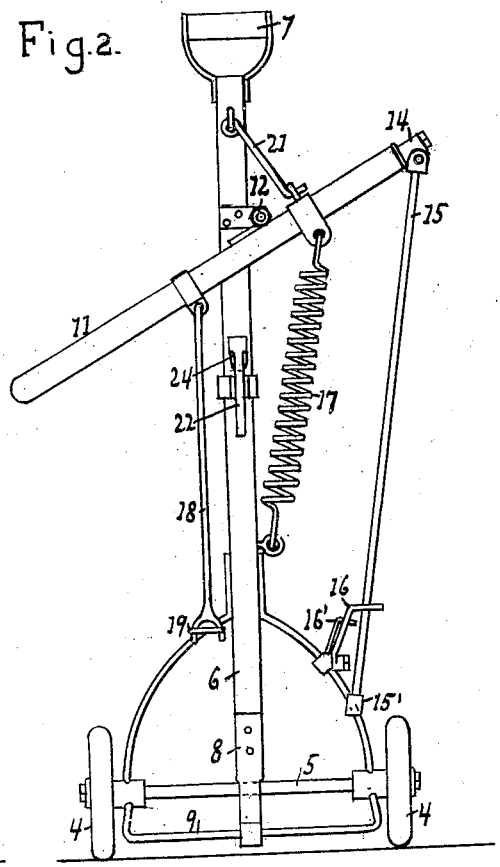
Fig. 2 is a front view of the same.

In these drawings the numeral 4 designates a pair of wheels loosely mounted on an axle 5 and a vertical upright or frame 6 is fixed to the axle. At the upper end of the frame 6 is located a handle 7 and to the lower end of the frame is bolted a foot member 8 to support the can. A cradle 9 secured to the axle prevents the can from moving sideways while it rests on the foot member and a rear toe member 10 serves to position the frame so as to slide the can into the cradle.

Figure 3:
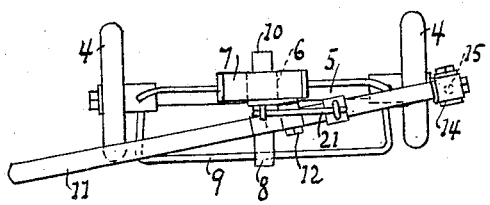
Fig. 3 is a plan view thereof.

Near the top of the frame, below the handle, is arranged a lever 11 and it is fulcrumed at 12 to the frame substantially in an oblique position in its relation to the frame as indicated in Fig. 3. At the forward end of the lever is fixed a swivel coupling 14 and pivoted to the coupling is an arm 15 having a foot buffer 15' to contact with the tread of a stairway. The end of the arm is limited in its movement by means of a bracket 16 swingingly connected to the upper part of the cradle and a spring 16' tends to pull the bracket toward the frame. Between the fulcrum and the swiveled coupling is hooked one end of a coiled spring 17 and the other end is attached to the side of the frame. A rod 18 with a hook 19 at its lower end is swingingly suspended from the lever. When it is desired to lift a can 20 on the frame at a distance from the stairway, the rod is swung, as shown in Fig. 1, and the hook engages the handle of the can. The spring 17 is placed under tension by pulling down the lever and it is held in that position by means of a latch 21 swingingly connected to the upper part of the frame and hooked to the lever. By unhooking the latch the spring is compressed and the rod lifts one end of the can onto the foot member and it slides back to set into the cradle. The upper end of the can is held by means of a clamp 22 sliding along the frame and frictionally held against upward or downward movement by a spring 24 fixed to the clasp.

When it is desired to wheel the can up a flight of stairs the latch is unhooked and the lever swings upward, thus pressing the swiveling foot arm against the surface of tread, thereby lifting the truck with its wheels gliding along the riser to the next tread. The forward end of the lever 11 is practically on a line with the axis of the frame so as to transmit uniform and downward push on the arm 15, causing it to equalize the raising of the truck.

What I claim is:

1. In a hand truck, the combination with a frame having an axle at its lower end, a pair of wheels mounted on the axle, a lever connected to the upper part of the frame, an arm having one end connected to the lever, the other end coacting with the tread of a stairway, said lever being set to exert downward pressure on the arm, and means for locking the lever when set.

2. In a hand truck, the combination with a frame having an axle at its lower end, a pair of wheels mounted on the axle, a lever fulcrumed to the upper part of the frame, an arm having one end swivelingly connected to the upper part of the lever, the other end coacting with the tread of a stairway, said lever being set to exert downward pressure on the arm, and means for locking the lever when set.

3. In a hand truck, the combination with a frame having an axle at its lower end, a pair of wheels mounted on the axle, a lever fulcrumed to the upper part of the frame, an arm having one end connected to the lever, the other end coacting with the tread of the stairway, a spring having one end connected to the lever between its fulcrum and arm and the other end to the frame, said lever being positioned to tension the spring so as to exert downward pressure on the arm, and a latch for locking the lever when positioned to cause pressure on the arm.

4. In a hand truck, the combination with a frame having an axle at its lower end, a pair of wheels mounted on the axle, a lever fulcrumed to the upper part of the frame, an arm having one end connected to the lever, the other end coacting with the tread of the stairway, a spring having one end connected to the lever between its fulcrum and arm and the other end to the frame, said lever being positioned to tension the spring so as to exert downward pressure on the arm, a latch for locking the lever when positioned to cause pressure on the arm, and means for limiting the movement of the arm.

5. In a hand truck, the combination with a frame having an axle at its lower end, a pair of wheels mounted on the axle, a lever fulcrumed to the upper part of the frame, a coiled spring having one end connected to the lever and the other end to the frame, a rod with a hook at its end swingingly suspended from the lever, said rod being made to hook onto the handle of a can, said lever being set to tension the spring, thus exerting downward pressure on the rod, and means for locking the lever in its set position but, when unlocked, the pull on the rod lifts the can onto the lower part of the frame.

In testimony whereof I have hereunto set my hand.

MARTIN JANKISZ.